Figure 1:
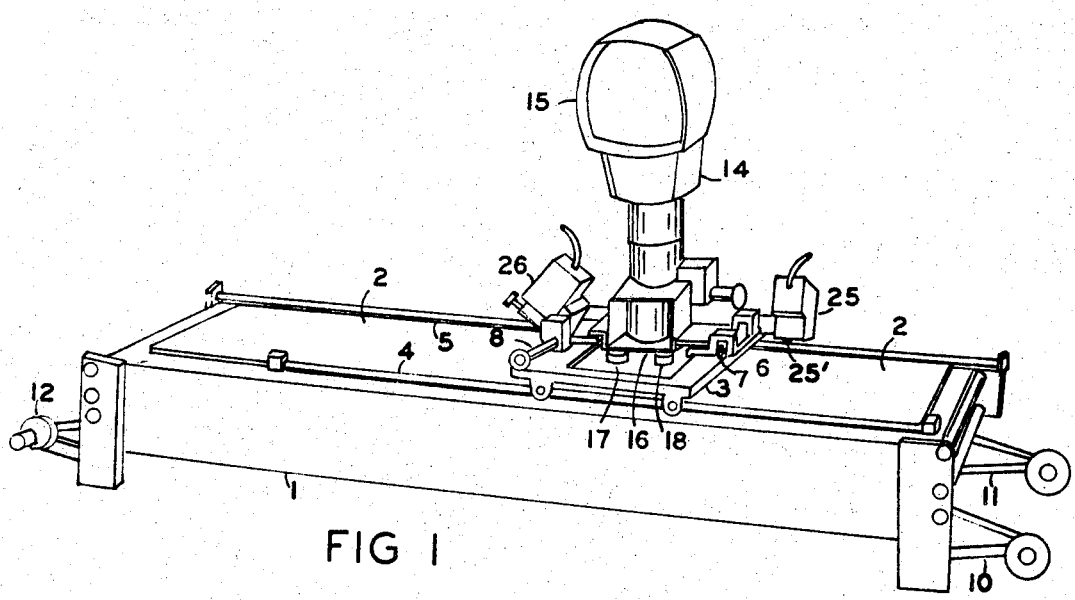
Figure 2:
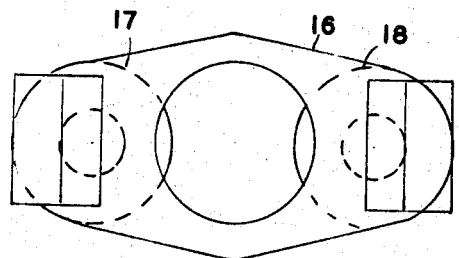
Figure 3:
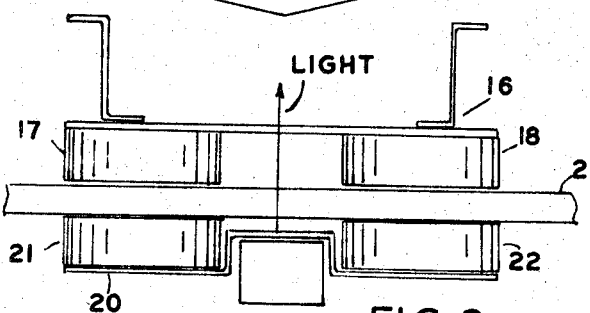
Figure 5:
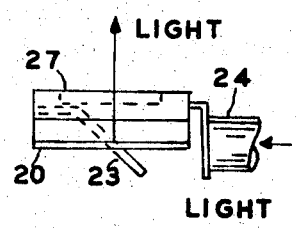
Figure 4:
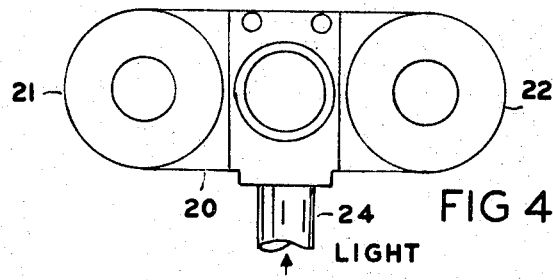

Jan. 14, 1969  A. R. BRAULT ET AL  3,421,813

TRAVELING PROJECTION LIGHT VIEWER MEANS

Filed June 6, 1966

INVENTOR.
ANDRE R. BRAULT
ROBERT E. WHITE
BY
James P. Malone

United States Patent Office 3,421,813
Patented Jan. 14, 1969

3,421,813
TRAVELING PROJECTION LIGHT VIEWER MEANS
Andre R. Brault, North Merrick, N.Y., and Robert E. White, Westbury, N.Y., assignors to OPTOmechanisms, Inc., Plainview, N.Y.
Filed June 6, 1966, Ser. No. 555,624
U.S. Cl. 353—22      4 Claims
Int Cl. G03b 21/14

This invention relates to film viewers and more particularly to film viewers of the type having a light table and a traveling pickup or magnifier projector.

In systems of this type the film negative is laid on the glass light table and magnifier projector is movably mounted over the table and adapted to magnify and project an image from the portion of the film. In order to provide sufficient light for this purpose, it is necessary to have a projector light under the projector table. In prior systems, light sources of this type were suspended from the movable viewer apparatus by means of long arms which extended around and under the table. In order to get full coverage of movement under the table, it is necessary for these arms to be very long so that the apparatus required a considerable amount of space and was cumbersome.

The present invention provides a new and improved projector light means which is magnetically coupled to the movable pickup or magnifier viewers through the glass plate. One set of magnets is connected to the viewer on top of the glass plate and a projection lens system is located under the glass plate and coupled to the viewer by means of the magnetic field. Light is supplied to the projector lens by means of the fiber optic cable from a conveniently located light source.

Accordingly, a principal object of the invention is to provide new and improved film viewing means.

Another object of the invention is to provide new and improved projection light means for film viewers.

Another object of the invention is to provide new and improved traveling light means for film viewers.

Another object of the invention is to provide new and improved viewing means comprising a light table, an optical pickup movably mounted above the table, a projection light means adapted to be mounted under the table and magnetic means to couple the movable pickup to the light means through a glass plate.

Another object of the invention is to provide new and improved viewing means for film comprising a transparent table, a viewer movably mounted over said table, a first magnet connected to said viewer, said magnet being suspended close to the upper surface of said table, projector light means adapted to be mounted under said table, a second magnet connected to said light means, said second magnet being adapted to be held under said first magnet by virtue of magnetic force between them whereby said light means follows movement of said viewer along said table.

These and other objects of the invention will be apparent from the following specification and drawings of which:

FIGURE 1 is a perspective view of the embodiment of the invention.

FIGURES 2, 3, 4, and 5 are detail views of the traveling light source of the embodiment of FIGURE 1.

Referring to the figures, FIGURE 1 shows a film viewing table 1 upon which is mounted a glass plate 2. The film to be viewed is placed on the glass plate 2. The carriage 3 is adapted to ride left and right along the rails 4 and 5 mounted on the table 1. Another carriage 6 is adapted to move on bearing 7 and bearings on the other side riding on the rod 8 along the axis perpendicular to the movable axis of the carriage 3.

Spool holders 10, 11 and 12 are provided for holding rolls of film. On the top of the carriage 6 is mounted a projector viewer 14. The projector viewer 14 contains a magnifier lens and mirror system for projecting magnified images of the film up and unto the screen 15.

In order to project the images with sufficient brightness, it is necessary for the projection source to be underneath the glass plate 2. In prior devices, the lamp is connected to the viewer with long arms which extend outwardly and back under the glass table. These arms must be sufficiently long enough for free movement of the viewer and as a result the apparatus is cumbersome.

In the present invention, specifically referring to FIGURES 2–5, the light source generally comprises an upper magnet assembly bracket 16 which is connected to the carriage 6. Bracket 16 assembly suspends magnets 17 and 18 over the glass plate 2 so that there is only a very small gap between the magnet and glass plate 2.

The light source comprises another magnet assembly including a bracket 20 which is connected to two magnets 21 and 22. Connected to the center of the bracket 20 is an assembly including a 45° mirror 23 and lens 27 to which light is fed by a flexible fiber optic cable 24, the other end of the fiber end cable 24 being connected to a stationary source of light.

The lower magnet assembly is relatively light in weight and is held under the side of the glass plate by means of magnetic attraction by the upper and lower magnets.

Therefore, when the viewer is positioned along the viewing table, the lower light assembly follows due to the magnet attraction. The magnets are cemented or otherwise connected to their holding brackets. The magnets themselves may be conventional and magnets suitable for this application are commercially available.

The light table preferably has an encoder means to feed out the coordinate information to suitable display indicators or to computers or other data processing apparatus. These may comprise an encoder unit 25 mounted on the carriage 3 and an encoder unit 26 mounted on the carriage 6. These encoders may comprise pulse generators having a shaft input which is connected to a wheel 25' which rides on one of the supporting rails. Specific details of such encoder transmitter are disclosed in copending application entitled Layout Machine With Encoder Means, Ser. No. 557,706, filed June 15, 1966.

Other viewing devices may be used instead of viewer 14 for instance, microscope means or other optical pickups may be so mounted.

Many modifications may be made by those who desire to practice the invention without departing from the scope thereof which is defined by the following claims:

We claim:
1. Viewing means for film comprising,
   a transparent table,
   a viewer movably mounted over said table,
   a first magnet connected to said viewer, said magnet being suspended close to the upper surface of said table,
   projector light means adapted to be mounted under said table,
   a second magnet connected to said light means, said second magnet being adapted to be held under said first magnet by virtue of magnetic force between them whereby said light means follows movement of said viewer along said table.

2. Apparatus as in claim 1 wherein said table is of glass.

3. Apparatus as in claim 2 wherein said light means comprises a projector lens and fiber optic cable which is adapted to be connected to a source of light.

4. Apparatus as in claim 1 wherein said viewer is a magnifier-projector viewer.

References Cited

UNITED STATES PATENTS

| | | | |
|---|---|---|---|
| 3,091,459 | 5/1963 | Lindman | 335—302 XR |
| 3,092,763 | 6/1963 | Cherel | 335—306 |
| 3,311,019 | 3/1967 | Valikov | 88—24 |
| 3,342,101 | 9/1967 | Zollner | 88—24 |
| 3,361,031 | 2/1968 | Stroud | 88—24 |

NORTON ANSHER, *Primary Examiner.*

LEO H. McCORMICK, Jr., *Assistant Examiner.*

U.S. Cl. X.R.

335—306, 47, 74, 79, 87